Jan. 11, 1972  A. SCHAERER  3,634,565
METHOD FOR CONTINUOUSLY MANUFACTURING
FOAMED PLASTIC PROFILES
Filed Nov. 19, 1969  2 Sheets-Sheet 1
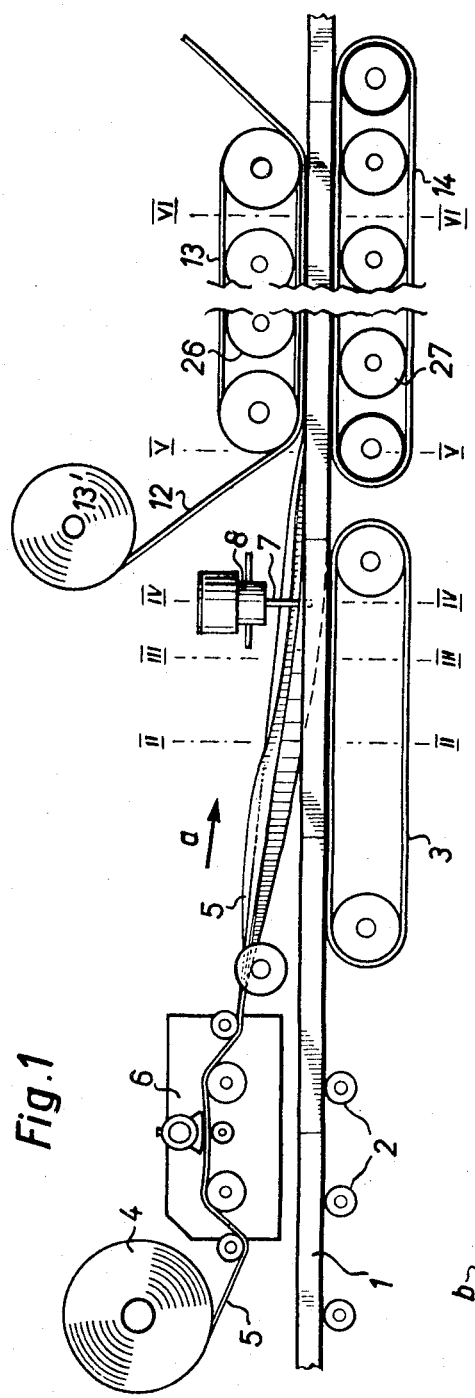
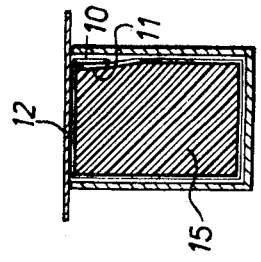
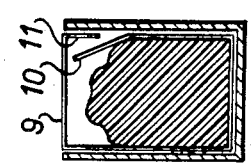
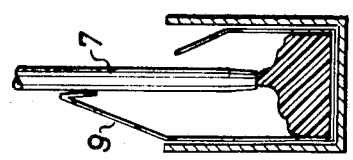
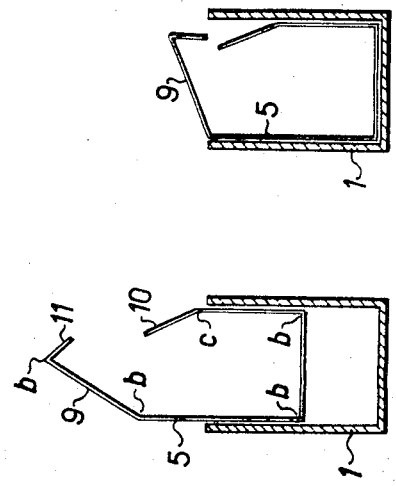
INVENTOR.
ANDRÉ SCHAERER

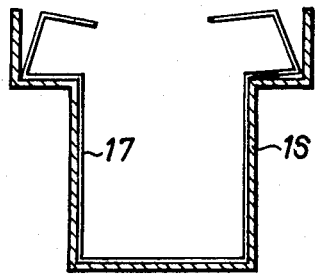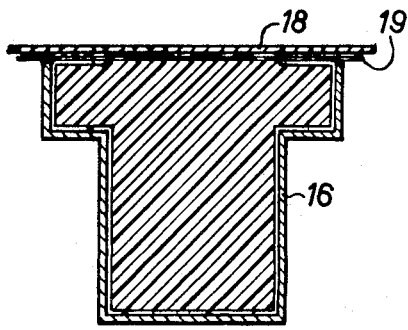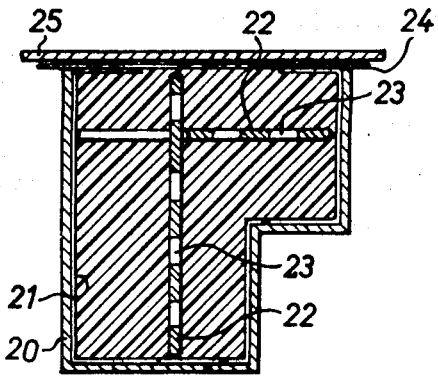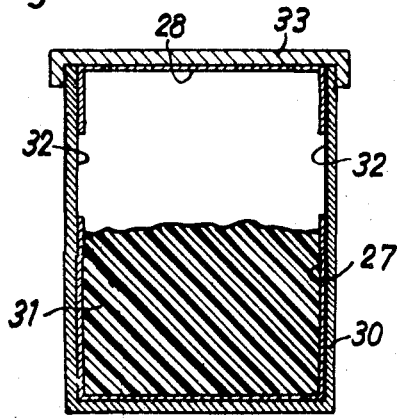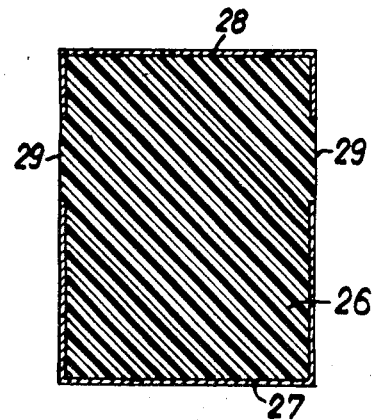

United States Patent Office 3,634,565
Patented Jan. 11, 1972

3,634,565
METHOD FOR CONTINUOUSLY MANUFACTURING FOAMED PLASTIC PROFILES
Andre Schaerer, 22 Sangglenstrasse, Pfaffhausen, Zurich, Switzerland
Filed Nov. 19, 1969, Ser. No. 878,011
Claims priority, application Switzerland, Nov. 20, 1968, 17,389/68
Int. Cl. B29d 27/04
U.S. Cl. 264—54        15 Claims

ABSTRACT OF THE DISCLOSURE

A method for the continuous manufacture of foamed profiles or sections of a thermoreactive resin, such as a urethane resin comprising the steps of continuously introducing a thermoplastic or metallic carrier web into an open top metallic carrier section having a cross-sectional shape corresponding to the cross-sectional shape of the foamed profile to be made. The thermoplastic carrier web is prefolded or precreased according to the cross-sectional shape of the plastic profile to be made, prior to the introduction of the web into the carrier section, to cause the web to snugly fit into the interior of the carrier section. The carrier section with the carrier web is then moved underneath and past a mixing head for the reactive resin mixture which flows out into the carrier web. Immediately thereafter a cover strip is moved over the open top carrier section to close the section while the resin mix therein is foaming. The closed carrier section is then held under pressure until foaming is terminated and the foamed profile has hardened and can be removed from the carrier section. The carrier web can fully or partly surround the foamed profile. The carrier web can consist of different thermoplastic materials, or of metal such as aluminum foils or sheets.

---

It is well known how to manufacture foamed profiles or sections, made from thermoplastic materials by adding a blowing agent which gives off gas at the temperature of extrusion. It is also possible to obtain foamed profiles by cutting them out of a block of foam. Such a profile however, shows the same cell size and density throughout the whole cross section. In order to obtain better mechanical strength, especially bending resistance, a foamed profile should have a structure which is similar to the structure of a bone. The surface should be dense and without porosity, and underneath this dense and specifically heavy skin with good mechanical properties, especially with regard to tensile strength and load bearing resistince, there should be a foamed structure of high density with very fine closed cells, the diameter of which increases toward the center of the profile so that the center of the foamed profile or section shows a foam with larger cell size of lower specific gravity.

This invention relates to a process for manufacturing such foamed profiles made of a thermoreactive resin, preferably of a urethane resin, with a dense skin free of porosity (pores) and a variable cell density and cell structure.

The method according to the present invention comprises introducing a carrier foil into a carrier section having an open top, the cross-sectional area of said carrier section corresponding to the cross-section of the foamed profile to be made, the carrier foil being precreased or prefolded to correspond to the shape of the foamed profile to be made and to snugly fit into said open top carrier section, moving said carrier section with the carrier foil therein beneath and past a mixing head, continuously feeding a resin mix from said mixing head into said carrier foil within the carrier section, moving a covering section over the open top of said carrier section to close the carrier section whereby the expanding foaming resin mix completely fills the space defined by said carrier and covering sections and applies the carrier foil against the walls of the carrier and covering sections, holding the carrier section and the covering section with the foamed profile under pressure until the foamed profile has hardened, and then removing the foamed profile from the carrier section.

Briefly stated, this method can be carried out as follows: A carrier foil in form of a tape or web made of a thermoplastic material is folded lengthwise in such a way that in transverse section it corresponds to the section of the profile to be foamed, and thereafter the foil is laid into a preferably metallic carrier section the top side of which is open. The folded carrier foil fits exactly into the inside of the metallic carrier section which is moved with a constant speed underneath a mixing head of a foam mixing device, whereby the reactive foam mixture is flowing out into the carrier foil. Upon reaction of the resin components the mixture starts to expand, so that the carrier foil is pressed by the foam against the metallic carrier section, whereby at this stage a prefolded flap of the foil is brought over the open head of the metallic section in such a way that it forms an overlapping closure. At the same time a metallic top section moves over the open carrier section to close the top side, thus enclosing the expanding foam mixture and the overlapping carrier foil which are moving forward under pressure until the reaction has taken place and the foam has hardened. Thereafter the foamed profile consisting of the foam core and the carrier film can be removed from the carrier section.

The method shall be described in more detail by reference to the accompanying drawings.

FIG. 1 is a diagrammatic representation of the apparatus for manufacturing a foamed thermoreactive profile.

FIG. 2 to FIG. 6 are cross sections along the lines II—II, III—III, IV—IV, V—V and VI—VI of FIG. 1 drawn to a larger scale and illustrating the different working phases when manufacturing the foamed profile.

FIGS. 7 and 8 are two transverse sections which are corresponding to those of FIG. 3 and FIG. 6, but relating to the manufacture of a foamed profile of a different shape using a separate cover foil.

FIG. 9 shows a transverse section through a foamed profile with embedded reinforcements.

FIG. 10 is a transverse section through a further foamed profile made in accordance with this invention.

FIG. 11 is a transverse section through the carrier section, the carrier foil and the cover foil showing one phase of the production of a profile according to FIG. 10.

Referring to FIG. 1, a preferably metallic carrier section 1 with an open top, the cross section of which corresponds to the shape of the foamed profile to be made, is carried on rolls 2 and moved forward by a variable speed conveyor belt 3 in the direction of the arrow *a*. A plastic foil in form of a continuous web 5 is drawn from a roll 4 and moved through a folding device 6 which is folding or creasing the web longitudinally in correspondence with the shape of the carrier section 1, and which operation will be hereafter simply referred to as folding or prefolding. After leaving the folding device 6 the folded web 5 is drawn into the carrier section 1 the top of which is open, such as shown also in FIG. 2 and FIG. 3. The profile to be manufactured shall have a corresponding rectangular shape. The carrier foil 5, which will enclose and carry the foaming mixture has to be folded or prefolded in such a manner as to fit exactly into the inside of the rectangular carrier section 1. The folding or pre-folding is carried out in such a way that a permanent fold or crease is obtained at those points of the web 5 which correspond to the edges of the foamed profile or the carrier section, consequently at the points $b$ in FIG. 2. A further fold or crease is provided at the point $c$, the use of which will be later explained.

The carrier foil or web 5 having been drawn into the carrier section 1 both of them are carried forward in the direction of the arrow $a$ and are passing underneath the orifice 7 of a mixing head 8, from which the reactive resin mix is flowing out into the carrier foil 5.

FIG. 3 shows the carrier foil 5 in the position when it is fully introduced in the carrier section 1. The width of the foil is somewhat larger than the circumference of the carrier section 1. When the carrier foil 5 and the carrier 1 are reaching the mixing head 8, the cover flap 9 of the carrier foil is lifted by the nozzle as shown in FIG. 4 in order to let the reactive resin mixture flow out into the inside of the carrier foil. Thereafter the carrier foil and the carrier section are moving forward into the position of FIG. 5, whereby after the end of the cream time the resin mixture starts to react and expand, thus filling out the hollow space of the carrier film. The expanding resin mixture is lifting the prefolded flap 10 of the foil into the right position in which the flap 11 is brought to overlap the flap 10 and both flaps are pressed together and toward the side wall of the carrier section by the expanding foam (FIG. 6). The flap 10 is acting as an air valve which will let the air escape before the expanding foam will fill out the cross section and close the valve, so that the foam mixture will be hermetically sealed against leaking out and arriving between the carrier foil 5 and the carrier section 1.

Before the expanding resin mixture will have filled out the complete cross section of the carrier section, the latter is moved forward into a twin belt conveyor having an upper belt 13 and a lower belt 14, while at the same time a flexible metallic strip 12 moves over the open top of the carrier section 1 to cover and close the carrier section. The carrier section 1 containing the foam filled carrier foil 5 and having been closed by the cover strip 12 is now moved slowly inbetween the two conveyor belts 13 and 14 and is kept under pressure by rolls 26 and 27 until the reaction has taken place and the foam has hardened, so that the foamed profile can be removed from the carrier section. A strip of aluminum sheet or flexible steel sheet can be used as cover strip 12. It can be continuously unrolled from a reel 13' or can be applied in ready cut lengths.

The carrier section preferably consists of extruded aluminum or brass sections having a length of 6 to 30 feet, which can be attached one to another. The cover strip 12 is being taken from the carrier section 1 as soon as they have left the conveyor belts 13 and 14. Then the hardened foamed profile 15 with the carrier film 5 is taken out of the carrier section which is disconnected from the following carrier section and brought again to the initial starting position on the rolls 2 and attached to the preceding carrier section 1 on the rolls 2 or conveyor 3 to be used again for receiving the prefolded web 5. In this manner the method can be carried out continuously. Only a restricted number of carrier sections 1 are required for manufacturing the foamed profiles in continuous lengths.

The method according to the invention also can be carried out in a discontinuous way. In doing so the folded or prefolded foil tape 5 which is cut to length is laid into a carrier section 1 which corresponds in length to the length of the carrier foil and is closed at both ends. Both are conveyed at a predetermined speed under the orifice of the mixing head 8 which is metering out a predetermined amount of resin mixture onto the carrier foil 5. Thereafter the carrier section 1 is covered by a cover strip 12 as shown in FIG. 6 and immediately brought under pressure by a hydraulic or mechanic clamping device until the foam has hardened. After that the foamed profile is removed from the carrier section 1 which can be used again for further production.

The carrier foils used according to the invention consist of metallic foils, impregnated fabric tape, printed or lacquered paper or plastic foils made of different thermoplastic materials, such as polyvinylchloride, polyvinylfluoride, methylmethacrylate, ABS copolymers, polystyrene or polyester. The carrier foils can also consist of metal foils or sheet metal, for example aluminum sheet up to 1 mm. thickness, preferably from 0.1 to 0.8 mm. thickness. The foils are used in printed, embossed, laminated, pigmented or lined structure. Of special interest are weather resistant foils made of polyvinylfluoride with which highly weather resistant profiles can be obtained. Very thin foils can be used, usually in a thickness of 0.05 to 0.2 mm., as just underneath the foil a dense and nonporous surface layer of foam is formed which is tightly bonded to the foil. Some foils will not sufficiently bond with the foamed resin. In such a case it has proven satisfactory to apply an intermediate lacquer as a bonding agent. Such lacquers, as made from urethanes, polyamides or methacrylates, enhance the bonding strength between the foam and the foil.

According to the invention the process can also be carried out with two or more foil strips of different composition and finish. Such an example is shown in FIGS. 7 and 8. Into the metallic carrier section 16 the prefolded carrier foil 17 is inserted. After having the resin mix metered out into the carrier foil 17, a cover section 18 with a cover foil 19 which is overlapping the carrier foil is added. The expanding foam pushes the carrier foil into the edges of the closed profile and at the same time it closes the profile against seepage of the expanding resin mix.

According to the invention the foamed profiles can also be provided with an embedded reinforcement which is partially or completely enclosed by the foam. FIG. 9 shows such a reinforced profile. The prefolded foil web 21 is drawn into the carrier section 20. Thereafter one or more preferably perforated reinforcement strips 22 made of metal or impregnated paper are laid into the profile. The resin mix flowing out of the mixing head (8 in FIG. 1) flows through the perforations 23 of the reinforcing strips to the bottom of the carrier foil 21 from which the resin mix will expand. During the rise of the resin mix a cover foil 24 and a cover section 25 are applied and kept under pressure until the foamed section has hardened. The rigid foam is bonded tightly to the embedded reinforcing strips which will increase the resistance against bending of the profile.

The carrier foil can be separated longitudinally into different types of foil which are attached to each other by bonding tapes. Multilayer foils, of which the outer foil can be made of weather resistant polyvinylfluoride and the inner layer can be composed of nonwoven glass fiber fabric can be used as a carrier material. In longitudinal direction of the foamed profile one half of the carrier web can consist of a metal foil and the other half of a plastic foil.

According to the invention it is also possible to cover only a portion of the outer surface of the foamed profile with a sheet or foil of plastics or of metal. Such a foamed profile is represented in FIG. 10.

The foamed profile 26 shown in FIG. 10 is covered in its lower portion by a plastic or metal foil 27, while its top portion is covered by a second plastic or metal foil 28. Between these two foils two surface portions 29 of the foamed profile are not covered by any foil and directly form the outer surface of the foamed profile. The two foils 27 and 28 may consist of the same or of different materials.

The manner of manufacturing the foamed profile according to FIG. 10 will be explained by reference to FIG. 11. First, a prefolded aluminum foil 27 is drawn into the carrier profile or mold 30 by means of the apparatus shown in FIG. 1. The foil 27 only extends to about one half of the height of the carrier profile 30. The portion 32 of the inner surface of the carrier profile 30, which shall not be covered by any foil, are coated with a mold release agent in order to prevent the foam from adhering to these surface portions. Now the carrier profile 30 with the inserted aluminum foil 27 is moved by the conveyor 3 of FIG. 1 towards the mixing device 8 which feeds the liquid reactive mix 31 into the foil 27. Immediately after having introduced the mix 31 into the foil 27, a cover strip 33 is made to slide over the open top of the carrier profile 30 to close this profile. A second prefolded aluminum foil 28 is slightly attached to the lower side of the cover strip, for example by local application of adhesive, so as to permit an easy separation of the foil 28 from the cover strip 33 after the foamed profile has hardened. The reactive mix now is foaming and fills the entire space in the carrier profile between the two foils 27 and 28. The carrier profile 30 together with the cover strip 33 are then held under pressure, as described with reference to FIG. 1, for example by pressure rollers 26 and 27, until the foamed profile has hardened. Then the cover strip 28 can be removed while the aluminum foil 28 firmly adheres to the foamed profile which can be taken out of the carrier mold 30. Since the portions 32 of the mold had been coated with a mold release agent as easy removal of the foamed profile is possible.

According to a further modification of the invention the foamed profile can also be manufactured by adding special fillers, such as foamed glass beads or for instance beads made of expanded clay. The beads are metered into the inside of the carrier foil with the help of a vibrating channel and the carrier foil is subsequently carried forward under the mixing head. The outflowing resin mix flows inbetween the beads which upon expansion of the foam are embedded therein.

The resins which are being used for the described process consist of two known components for manufacturing rigid urethane foams, which are being mixed within a mixing head before flowing out into the carrier foil. One of the two components, subsequently called component A, consists of a known polyglycolether which can be made by condensation of propyleneoxyde and trimethylpropane with a hydroxyl number of preferably 350 to 500. To this liquid polyether 5 to 50 parts by weight monofluortrichlormethane and 1 to 3 parts of N-methylmorpholin, triethylenediamin or tindioctoate are added, the first serving as a blowing agent and the second as a catalyst. The component B consists of a commercially available isocyanate as for instance 4,4' diisocyanato-diphenylmethan. In order to increase the mechanical properties of the rigid foam, such as surface hardness, an appropriate filler, such as asbestos powder, talcum powder, quartz powder, bentonite or clay powder may be added from 10 to 100 percent of weight to both components A and B. Subsequently both components are pumped continuously into a mixing head where a continuous intensive mixing takes place. The mixed resins and fillers flow out into the inside of the carrier foil.

The two components A and B start to react with each other upon mixing whereby polymerisation and cross-linking takes place. The reaction is exotherm so that the monofluor-trichlormethane which acts as a blowing agent starts to boil and brings the hardening resin mix to foam. The reactive resin mix flows out from the orifice of the mixer into the carrier foil contained in the metallic carrier section which acts to carry off the heat developed by the exotherm reaction, with the effect that the blowing agent will not be as effective as in the warm center of the profile. As a result, a denser skin of a higher density foam will develop in the outer layers of the foamed profile which has an irregular cell structure greatly improving its mechanical properties.

What is claimed is:

1. A method for continuously manufacturing foamed profiles formed of urethane resin, which comprises the steps of pre-folding a carrier foil into a T or rectangular cross-sectional shape which essentially corresponds to the shape of the foamed profile to be manufactured includes a pair of pre-folded portions which will overlap to form a lap joint, introducing the pre-folded carrier foil into a carrier section having an open top and a cross-sectional area which corresponds to the cross-section of the foamed profile to be manufactured, the carrier foil snugly fitting into the open top carrier section, thereafter moving the carrier section together with the carrier foil located therein beneath and past a mixing head, continuously feeding a resin mix from the mixing head into the carrier foil located within the carrier section, moving a covering section over the open top of the carrier section to close the carrier section, foaming the resin mix within the carrier foil so that the expanded foaming resin mix completely fills the space defined by the carrier section and covering section and presses the carrier foil against the walls of the carrier section and covering section and closes the carrier foil by pressing the pair of pre-folded portions of the carrier foil into overlapping relationship against one another through the action of the foaming resin mix in order to form a lap joint within the closed carrier section, maintaining the carrier section and the covering section containing the foamed profile under pressure until the foamed profile has hardened, and thereafter removing the foamed profile from the carrier section.

2. The method as defined in claim 1, wherein the carrier foil is pre-folded into a shape wherein its bottom portion is substantially flat and corresponds to the shape of the neighboring portion of the foamed profile to be manufactured, said substantially flat bottom of the carrier foil when inserted into the carrier section nesting at all locations against the bottom of the carrier section.

3. The method as defined in claim 1, further including the step of using as the carrier foil a web, continuously moving the web through a pre-folding device where the web is pre-folded into said shape which substantially corresponds to the shape of the foamed profile to be manufactured, using as the carrier section a carrier section formed of a plurality of successive metallic carrier section portions, introducing the thus folded web into such plural portion-carrier section, moving the web together with the plural portion-carrier section past the mixing head, and following removal of the hardened foamed profile again using the plural portion-carrier section for introducing continuously moving pre-folded carrier foil thereinto to again manufacture further foamed profiles with the aid of the same plural portion-carrier section.

4. The method as defined in claim 1, further including the step of inserting a length of carrier foil into a carrier section closed at both ends and which is moved together with the inserted length of carrier foil beneath and past the mixing head.

5. The method as defined in claim 4, further including the step of utilizing a pre-folded carrier foil whose circumferential extent is larger than the circumference of the profile to be foamed, so that during the foaming action two longitudinal edges of the carrier foil are pressed by the expanding foam into overlapping relationship with respect to one another and against one another as well as against the carrier section.

6. The method as defined in claim 5, further including the step of pre-folding the carrier foil at its longitudinal edges so as to form two flaps which function in cooperative relationship with one another in the manner of a valve to permit air which is displaced by the expanding foam to escape from the confines of the carrier foil, while on the other hand such flaps are urged into overlapping relationship with one another after foaming of the resin mix has terminated so as to form a tight closure preventing escape of the foamed resin mix from the interior of the carrier foil.

7. The method as defined in claim 1, further including the step of using a carrier foil which is formed of two parts, pre-folding one of said parts of the carrier foil so as to possess a cross-section corresponding to the cross-section of the carrier section, the other part of the carrier foil being applied together with said covering section and forming a covering foil of the profile to be foamed.

8. The method as defined in claim 1, including the step of longitudinally subdividing the carrier foil into several foil portions.

9. The method as defined in claim 1, including the step of using as the carrier foil a member selected from the group comprising metallic foils or sheets, impregnated fabric webs and thermoplastic foils.

10. The method as defined in claim 1 including the step of using as the carrier foil a multi-layer laminated foil.

11. The method as defined in claim 10, including the step of using as the carrier foil a weather-resistant outer layer formed of polyvinylfluoride and an inner layer formed of glass fiber fleece.

12. The method as defined in claim 1, further including the step of using a filler which is introduced into the carrier foil prior to feeding the resin mix into the carrier foil.

13. The method as defined in claim 12, including the step of using as the filler a material selected from foamed glass beads and foamed clay beads.

14. The method as defined in claim 1, further including the step of placing reinforcement means into the carrier foil prior to the feed of resin mix thereinto.

15. The method as defined in claim 14, wherein such reinforcement means comprise a member selected from perforated metal strips or impregnated paper board strips.

References Cited

UNITED STATES PATENTS

| | | | |
|---|---|---|---|
| 2,744,042 | 5/1956 | Pace | 264—45 |
| 2,983,962 | 5/1961 | Merz et al. | 264—47 |
| 3,123,856 | 3/1964 | Dye | 264—47 |
| 3,233,576 | 2/1966 | Voelker | 264—47 X |
| 3,249,659 | 5/1966 | Voelker | 264—47 |
| 3,383,257 | 5/1968 | James | 264—54 UX |
| 3,501,558 | 3/1970 | Munters et al. | 264—47 |
| 3,510,392 | 5/1970 | D'Eustachio et al. | 260—2.5 AK |
| 3,514,507 | 5/1970 | Can Dop et al. | 264—47 X |

JULIUS FROME, Primary Examiner

J. B. LOWE Assistant Examiner

U.S. Cl. X.R.

18—4 B, 5 A, 5 P; 264—47, 267, Dig 14, Dig 17